United States Patent [19]

Ohazama

[11] Patent Number: 6,078,332
[45] Date of Patent: Jun. 20, 2000

[54] REAL-TIME LIGHTING METHOD USING 3D TEXTURE MAPPING

[75] Inventor: Chikai J. Ohazama, Tallahassee, Fla.

[73] Assignee: Silicon Graphics, Inc., Mountain View, Calif.

[21] Appl. No.: 08/789,297

[22] Filed: Jan. 28, 1997

[51] Int. Cl.[7] .................................................. G06T 15/50
[52] U.S. Cl. ........................ 345/426; 345/421; 345/430
[58] Field of Search .................................... 345/426, 430, 345/421

[56] References Cited

U.S. PATENT DOCUMENTS

| | | | |
|---|---|---|---|
| 5,268,996 | 12/1993 | Steiner et al. | 345/426 |
| 5,490,240 | 2/1996 | Foran et al. | 345/430 |
| 5,767,858 | 6/1998 | Kawase et al. | 345/430 |

OTHER PUBLICATIONS

"Direct Volume Rendering with Shading via Three–Dimensional Textures" by Gelder and Kim, IEEE, pp. 23–30, 1996.

"Computer Graphics Principles and Practices" by J. Foley and A. Van Dam, 2nd Edition, 1990, pp. 722–744.

"Computer Graphics" by Donald Hearn and M. Pauline Baker, 2nd Edition, 1994, pp. 497–515.

"Direct Volume Rendering with Shading via Three–Dimensional Texture" by A. Van Gelder and Kwansik Kim, IEEE, pp. 23–30, 1996.

*Primary Examiner*—Mark R. Powell
*Assistant Examiner*—Kimbinh T. Nguyen
*Attorney, Agent, or Firm*—Wagner, Murabito & Hao LLP

[57] ABSTRACT

The present invention includes a method and system for providing real-time realistic lighting to graphics objects within a computer controlled graphics display system utilizing 3D texture mapped light values. The present invention generates and utilizes a 3D texture map indicating light intensity values with a predefined 3D graphics region. In generating the 3D texture map light values, the present invention selects a point (x, y, z) within the 3D graphics region that is to be displayed on a display screen and determines which light sources contribute to the illumination of the point. Based on the light sources that do contribute to the illumination of the point, the original intensity of each light source and its distance from the point are determined. Based on a determined distance formula, the attenuation of each light source is determined with respect to the point. Based on the attenuation and intensity data, the light intensity value of the point is determined. These steps repeat until the light intensity of every point of the 3D graphics region is determined. What results is a 3D light "texture map" of light intensity values representing light intensity values of the 3D graphics region. The computer stores the 3D light texture map in computer readable memory. The system also takes into account reflected light within a 3D graphics region by reiterating the above. Based on polygon vertices, texture coordinates, and the light intensity value of each point, the rendering process displays a properly lit graphics scene on a display.

20 Claims, 11 Drawing Sheets

REAL-TIME LIGHTING METHOD USING 3D TEXTURE MAPPING

BACKGROUND OF THE INVENTION

(1) Field of the Invention

The present invention relates to the field of computer controlled graphics display systems. More specifically the present invention relates to the field of performing real-time lighting utilizing three dimensional (3D) texture mapping to perform interactive graphics features.

(2) Prior Art

Computer controlled graphics systems are used for displaying graphics objects on a display screen. These graphics objects are composed of graphics primitive elements ("graphics primitives") that include points, lines, polygons, etc. Sequences of graphics primitives can be used to render a two dimensional (2D) image of a three dimensional (3D) object on a display screen. To create more realistic looking 3D graphics objects, texture mapping is used. Texture mapping refers to techniques for using 2D texture images for adding surface detail images to areas or surfaces of these 3D graphics objects. Along with 2D texture mapping, different lighting and shading techniques are also used to further refine the displayed images to create more realistic depiction of the graphics objects. Heretofore, texture mapping has only been used to perform lighting on graphics objects in a technique which has 2D texture mapping called bumpmapping.

Lighting and shading techniques that help create more realistic images are well known by those skilled in the art, and are discussed in a number of publications, such as *Computer Graphics: Principles and Practice* by James D. Foley et al., Addison-Wesley (1990). One well known prior art lighting technique is the use of a radiosity method to light and shade graphics objects. Radiosity is defined with relation to the rate of energy that leaves a surface. This rate of emitted surface energy is the sum total of all the energy reflected or emitted by the graphics surface. A radiosity method calculates the rate of emitted surface energy of all the graphics objects within a specific graphics scene. The information determined by the radiosity method is then used to provide the lighting values for the graphics objects within that scene. Generally, two steps are required to implement the radiosity values into the process of lighting graphics objects. The first step requires using a radiosity method to determine the light interaction between the graphics objects of a scene independent of the viewing angle of the scene. The second step renders the desired view of the scene and lights the graphics objects according to the radiosity values computed by complex functions during the radiosity method.

Light imaging using radiosity methods is one method to provide lighting values for graphics objects, but there are some disadvantages associated with these methods. One disadvantage associated with radiosity methods for lighting is that they are highly computation intensive requiring a computer system to spend substantial processing time determining the light interaction between graphics objects. The extended computer computation time is not a disadvantage if the predefined graphics scene displayed remains unchanged. However, if the scene requires real-time interaction with new objects moving into and out of a predefined viewing area, the increased processing time required of the radiosity methods for lighting is unworkable. Because of this extended computation time, two scenarios can exist if a new graphics object enters the viewable scene. The first scenario requires the recalculation of the radiosity values within the entire graphics scene. The second scenario requires maintaining the lighting values constant within the scene. Either scenario exhibits a substantial disadvantage to the graphics scene. For instance, choosing the first scenario results in a realistic scene, but producing the realistic scene requires extended computation time reducing real-time characteristics. The second scenario results in a scene that reacts in real-time, but the new object is unaffected by the established lighting values within the viewable scene resulting in the object appearing unrealistic. Therefore, it would be advantageous to provide a lighting technique that offers real-time lighting capability and that further exhibits real-time lighting of new graphics objects that enter a predefined graphics scene. The present invention provides these advantages.

Another prior art lighting technique is based on the normal vector of a polygon surface in combination with a vector representing the direction of the light. This "normal vector" technique requires computer computations to determine the light intensity at a polygon surface. Light imaging using the "normal vector" technique works for many applications, but there are some disadvantages associated with it. One disadvantage associated with the "normal vector" technique is that the graphics objects within a predefined scene do not cast shadows on other objects. By not casting shadows, the displayed graphics objects within the scene appear unrealistic. Therefore, it would be advantageous to provide a lighting technique that causes the graphics objects within a predefined scene to cast shadows. The present invention provides this advantage.

Another disadvantage associated with the "normal vector" technique is that it becomes computationally intensive during certain situations. These situations include the involvement of multiple light sources within a graphics scene or the act of turning on and off light sources within a scene. These situations result in computations that require a computer system to spend substantial processing time determining the light intensity of the object surfaces within a scene. The extended processing time causes some real-time applications using the "normal vector" technique to be unworkable especially when this technique is applied in real-time to new objects that enter the graphics scene. The disadvantages of the "normal vector" lighting technique hinder its effectiveness. Therefore, it would be advantageous to provide a lighting technique that reacts in real-time to the turning on and off of light sources within a graphics region and that provides lighting effects to the new objects that enter the graphics scene. The present invention provides these advantages.

The disadvantages of the prior art graphics lighting and shading techniques discussed above illustrate the need for a lighting technique that does not exhibit the above stated problems. The present invention provides such a system and method for providing lighting to graphics objects within a scene.

SUMMARY OF THE INVENTION

The present invention includes a method and system for providing real-time realistic lighting to graphics objects within a computer controlled graphics display system utilizing 3D texture mapped light values. The present invention generates and utilizes a 3D texture map indicating light intensity values with a predefined 3D graphics region. In generating the 3D texture map light values, the present invention selects a point (x, y, z) within the 3D graphics region that is to be displayed on a display screen and determines which light sources contribute to the illumination of the point. Based on the light sources that do contribute to the illumination of the point, the original intensity of each light source and its distance from the point are determined. Based on a determined distance formula, the attenuation of each light source is determined with respect to the point. Based on the attenuation and intensity data, the light intensity value of the point is determined. These steps repeat until the light intensity of every point of the 3D graphics region is determined. What results is a 3D light "texture map" of light intensity values representing light intensity values of the 3D graphics region. The computer stores the 3D light texture map in computer readable memory. The system also takes into account reflected light within a graphics region by reiterating the above.

The rendering process of the present invention uses the generated 3D texture map of light intensity values and receives the vertices of the polygons (or other graphics primitives) that are within the 3D graphics region. Each vertex coordinate is scaled and translated to compute the corresponding texture coordinates for the polygon coordinates. Based on the polygon vertices, the texture coordinates, and the light intensity value of each point within the graphics region, the rendering process displays a properly lit graphics scene on a display screen, with proper shadowing, etc.

The present invention has the advantage of performing real-time lighting within a predetermined graphics environment. A benefit of real-time lighting is that graphics objects that enter the fixed environment are affected by the existing lighting and shadows of the environment providing realistic graphics displays. For example, using the present invention an entering object becomes darker as it passes through the shadow cast by another object within the environment. Furthermore, the present invention enables a predetermined graphics environment to properly represent real-time lighting and shadows as light sources are interactively turned on and off within the environment.

DESCRIPTION OF THE PREFERRED EMBODIMENTS

In the following detailed description of the present invention, numerous specific details are set forth in order to provide a thorough understanding of the present invention. However, it will be obvious to one skilled in the art that the present invention may be practiced without these specific details or by using alternate elements or methods. In other instances well known methods, procedures, components, and circuits have not been described in detail as not to unnecessarily obscure aspects of the present invention.

NOTATION AND NOMENCLATURE

Some portions of the detailed descriptions which follow (e.g., processes 600, 700, 800, and 900) are presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a computer system. For reasons of convenience, and with reference to common usage, these signals are referred to as bits, values, elements, symbols, characters, terms, numbers, or the like with reference to the present invention.

It should be borne in mind, however, that all of these terms are to be interpreted as referencing physical manipulations and quantities and are merely convenient labels and are to be interpreted further in view of terms commonly used in the art. Unless specifically stated otherwise as apparent from the following discussions, it is understood that throughout discussions of the present invention, discussions utilizing terms such as "processing" or "computing" or "generating" or "calculating" or "determining" or "displaying" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers or other such information storage, transmission or display devices.

COMPUTER CONTROLLED GRAPHICS DISPLAY SYSTEM

Figure 1:
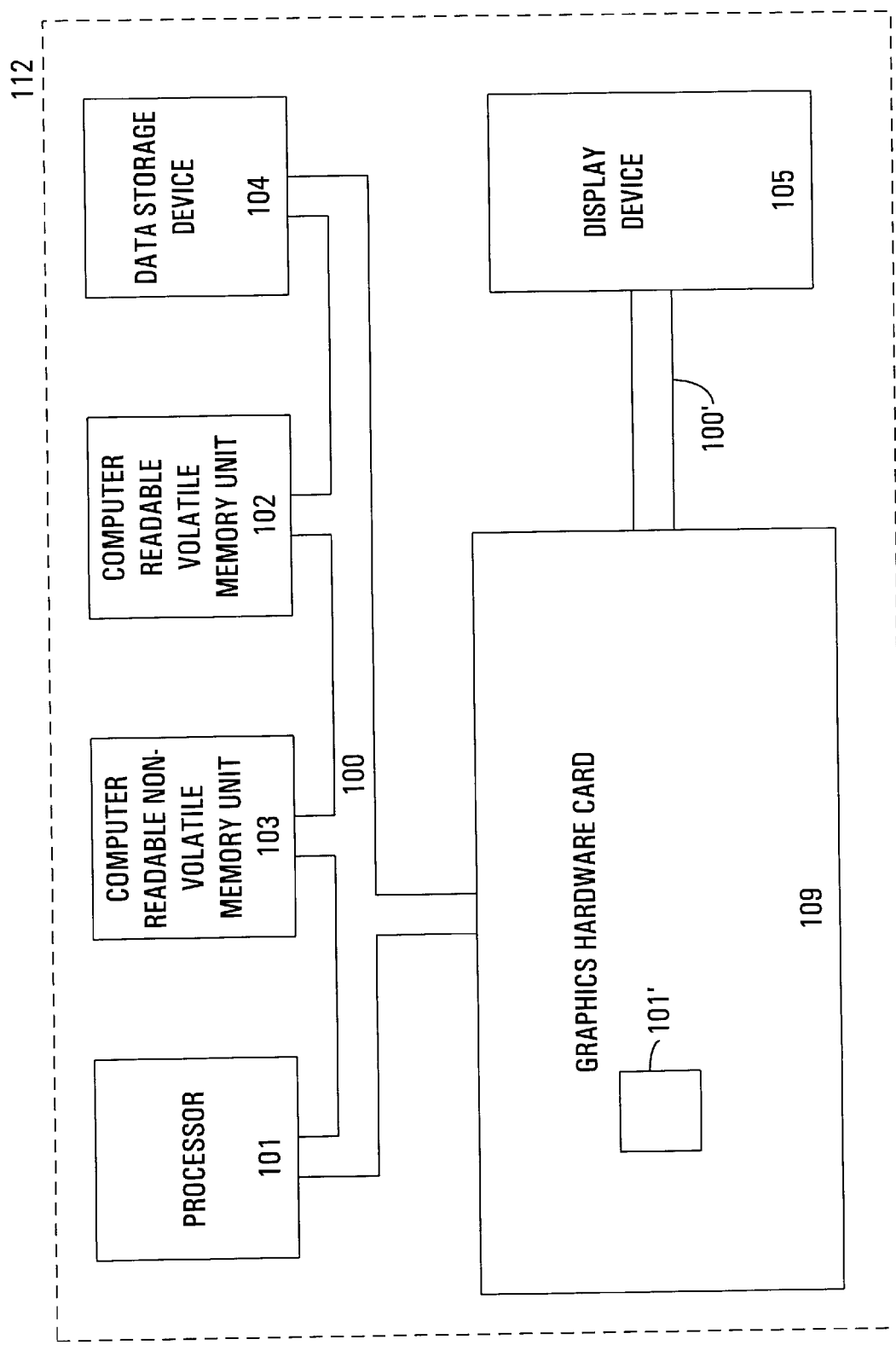
FIG. 1 shows a block diagram of a computer controlled graphics display system that can be used in accordance with the present invention.

With reference to FIG. 1, a block diagram is shown of a computer controlled graphics display system 112 used in accordance with the present invention. In general, computer system 112 used by an embodiment of the present invention comprises an address/data bus 100 for communicating information, one or more a host processors 101 coupled with bus 100 for processing information and instructions, a computer readable volatile memory unit 102 (e.g. random access memory unit) coupled with bus 100 for storing information and instructions (e.g., graphics data) for the host processor 101, a computer readable non-volatile memory unit 103 (e.g., read only memory unit) coupled with bus 100 for storing static information and instructions for the host processor 101, a computer readable data storage device 104 such as a magnetic or optical disk and disk drive (e.g., hard drive or floppy diskette) coupled with bus 100 for storing information and instructions, and a display device 105 coupled to bus 100 for displaying information (e.g., graphics primitives) to the computer user. The display device 105 utilized with the computer system 112 of the present invention can be a liquid crystal device, cathode ray tube, or other display device suitable for creating graphic images and alphanumeric characters recognizable to the user.

Computer system 112 also provides data and control signals via bus 100 to a graphics hardware unit ("card") 109. The graphics hardware card 109 typically contains a display processor 101' and other specialized hardware units for processing a series of display instructions found within a memory stored display list to render graphics primitives. The display processor 101' supplies data and control signals to a frame buffer (not shown) which refreshes the display device 105 for rendering images (including graphics images).

THREE-DIMENSIONAL TEXTURE MAP OF LIGHT INTENSITY VALUES

Figure 2:
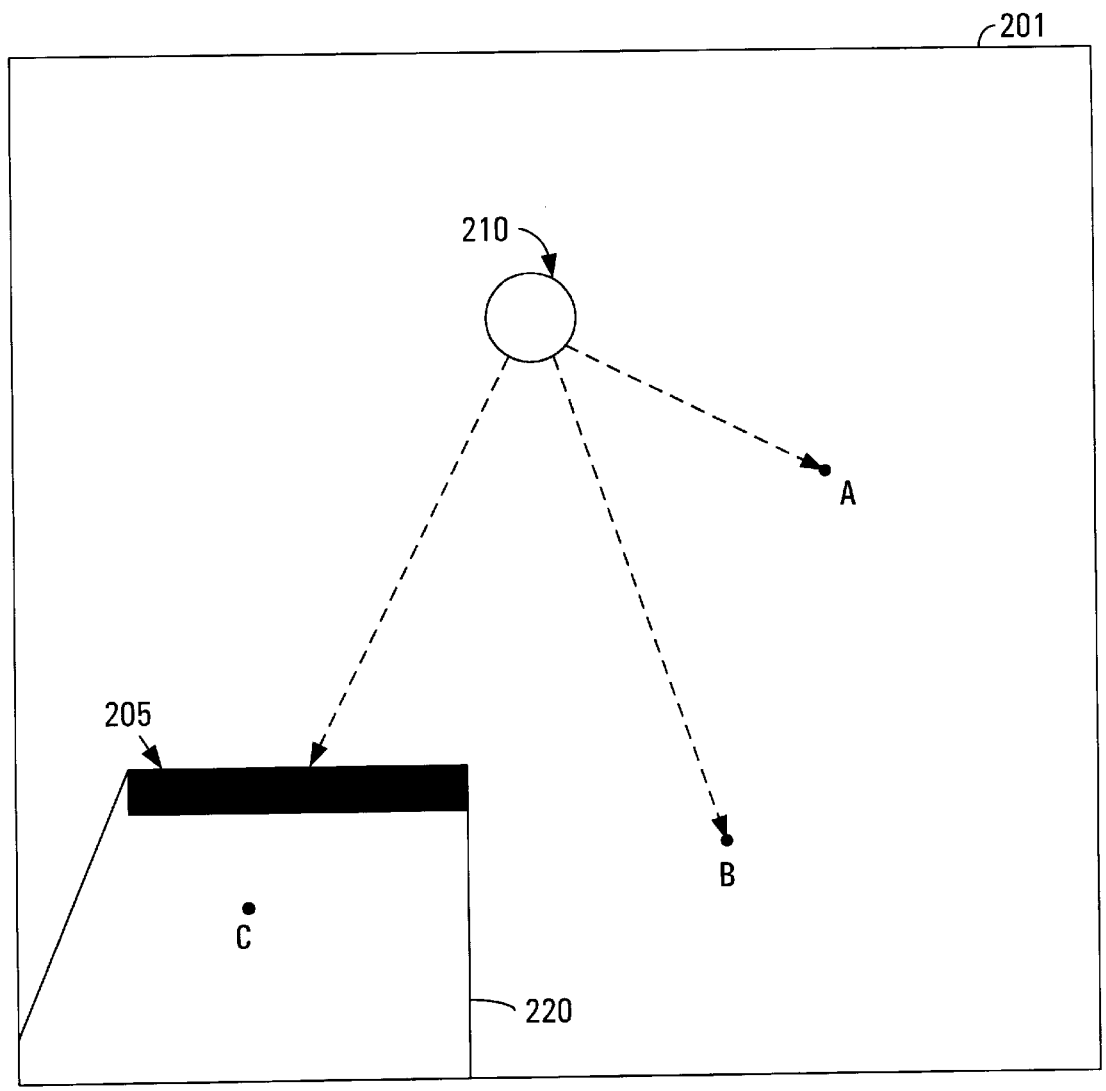
FIG. 2 shows an exemplary two dimensional room ("region") and exemplary points that are illuminated by the light source.

The present invention includes a method and system for providing real-time realistic lighting within a computer controlled graphics display system utilizing a 3D texture map of light intensity values. Generally, light presence ("intensity") within graphics systems is the quantification of the amount of light that impinges at a point from all directions. The combination of the existence of light and the intensity of light at a point make up the two components of light presence. Two illustrations are provided to help visualize the two components of light presence. Each illustration uses a representation of 2D area only as an example, but the principles are extendible to 3D area. FIG. 2 illustrates the existence of light within a predefined 2D room 201. For instance, FIG. 2 includes room 201, points A–C, light source 210, wall 205, and shadow region 220. Within room 201, points A and B are exposed to light source 210 while shadow region 220 of wall 205 obscures point C from any light. Therefore, light exists at points A and B while light does not exist at point C.

For the lighting to appear realistic within a computer displayed graphics representation of room 201, the existence or non-existence of light at every point within the graphics region needs be determined by computer system 112 (FIG. 1).

Together with the determination of the existence of light, light presence requires the determination of the intensity of light at every point. Light intensity corresponds to the increased or decreased effect of the light source on the points within a predefined area. For example, the further away a point is located from a light source, the less effect the light source has on that point which results in a dimly lit point. Conversely, the closer a point is located to a light source, the more effect the light source has on that point which results in a brightly lit point.

Figure 3:
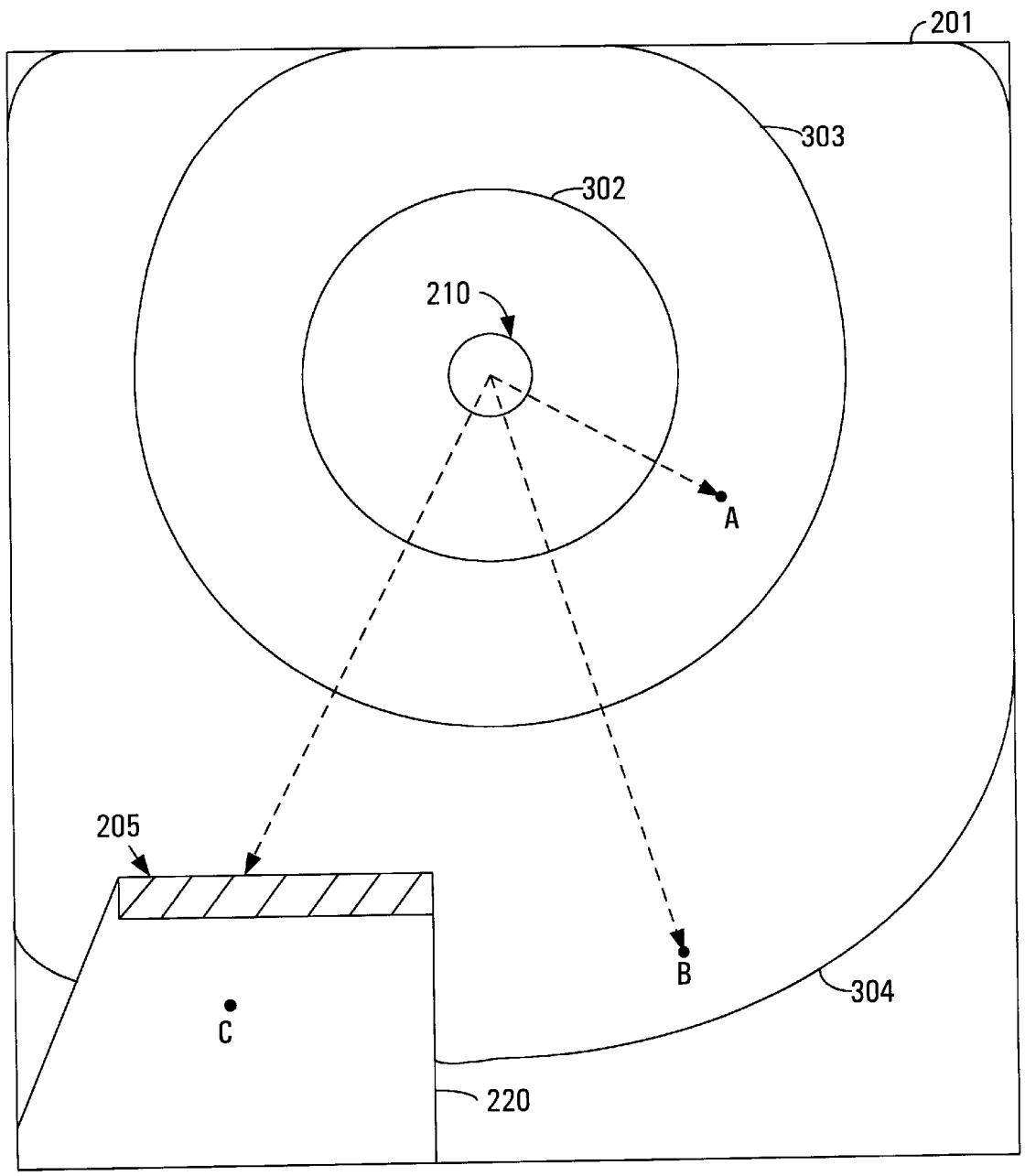
FIG. 3 illustrates the intensity values of an exemplary light source within an exemplary two dimensional room.

FIG. 3 illustrates an example of light intensity within a predefined 2D room 201. For instance, FIG. 3 includes room 201, intensity circles 302–304, points A–C, light source 210, wall 205, and shadow region 220. Intensity circles 302–304 represent different light intensity values of light source 210 at different distances from light source 210. The closer an intensity circle is located to light source 210, the higher the light intensity value it encompasses. For example, intensity circle 303 encompasses point A while intensity circle 304 encompasses point B. Therefore point A has a higher light intensity value than point B because intensity circle 303 is located closer to light source 210 than intensity circle 304. Point C is unaffected by the light intensity of light source 210 because point C is located within shadow region 220 of wall 205.

For the lighting to appear realistic within a computer displayed graphics representation of room 201, light existence and intensity at every point within the predefined graphics region needs be determined by computer system 112 (FIG. 1).

Light presence is the combination of the existence of light and the intensity of light at a point. The present invention determines the light presence of every point (x, y, z) within a predefined 3D graphics region similar to the 2D room 201 within a computer controlled graphics display system 112 (FIG. 1). Moreover, the present invention determines the light presence of every point of all the graphics objects within a predefined 3D graphics region within a computer controlled graphics display system 112.

Figure 4A:
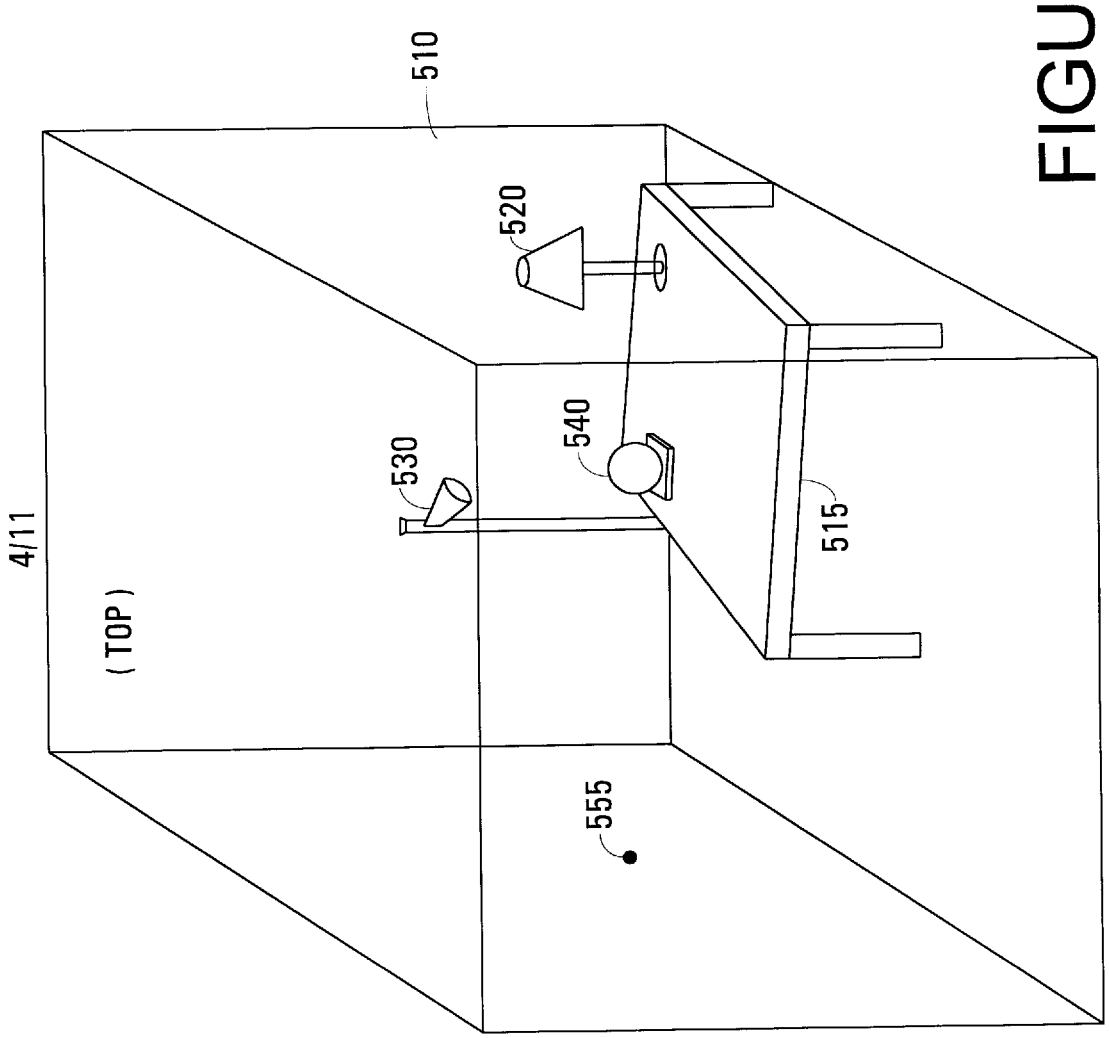
FIG. 4A illustrates an exemplary predefined three dimensional graphics region containing exemplary light sources that can be selectivity turned on or off and objects that do not originally cast light.
Figure 4B:
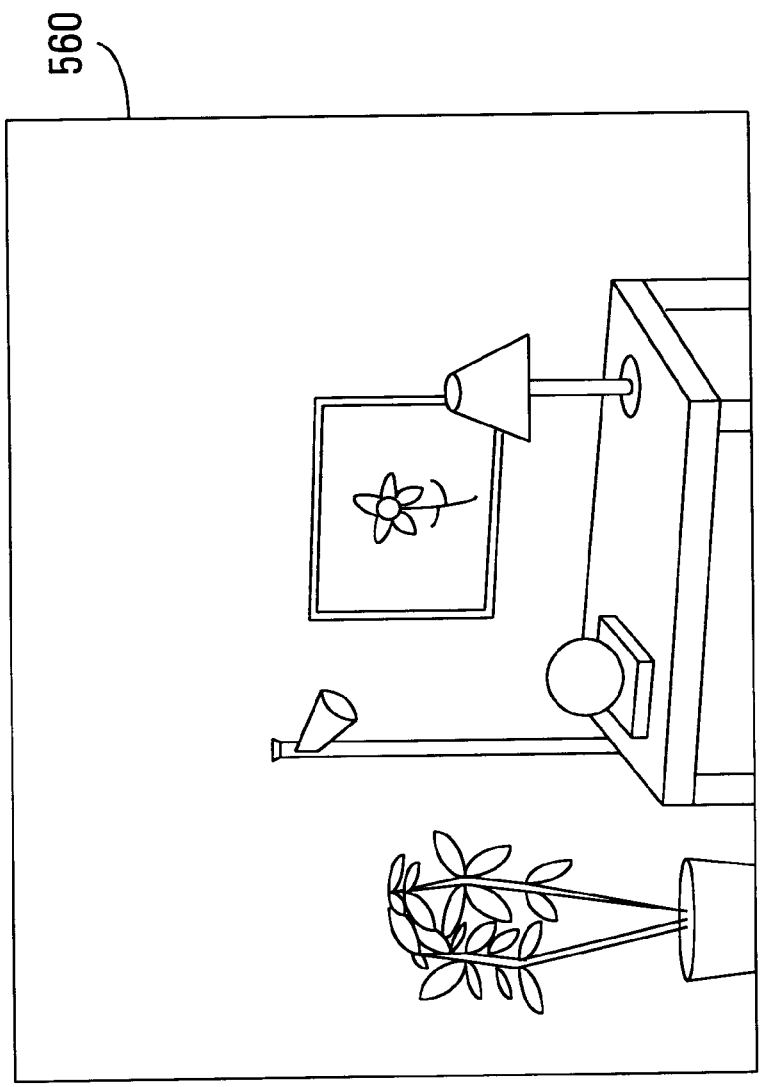
FIG. 4B illustrates a two dimensional representation of FIG. 4A that is displayed on a display screen.

FIG. 4A illustrates a predefined 3D graphics region 510 containing objects to be rendered on display screen 105 (FIG. 1). 3D graphics region 510 contains point 555, objects 515 and 540 that do not originally cast light, and light source objects 520 and 530 that can be selectively turned on and off. FIG. 4B illustrates a 2D graphical representation 560 of 3D graphics region 510 (FIG. 4A) that is displayed on display screen 105 of FIG. 1 (as a result of rendering processes in accordance with the present invention).

Figure 5:
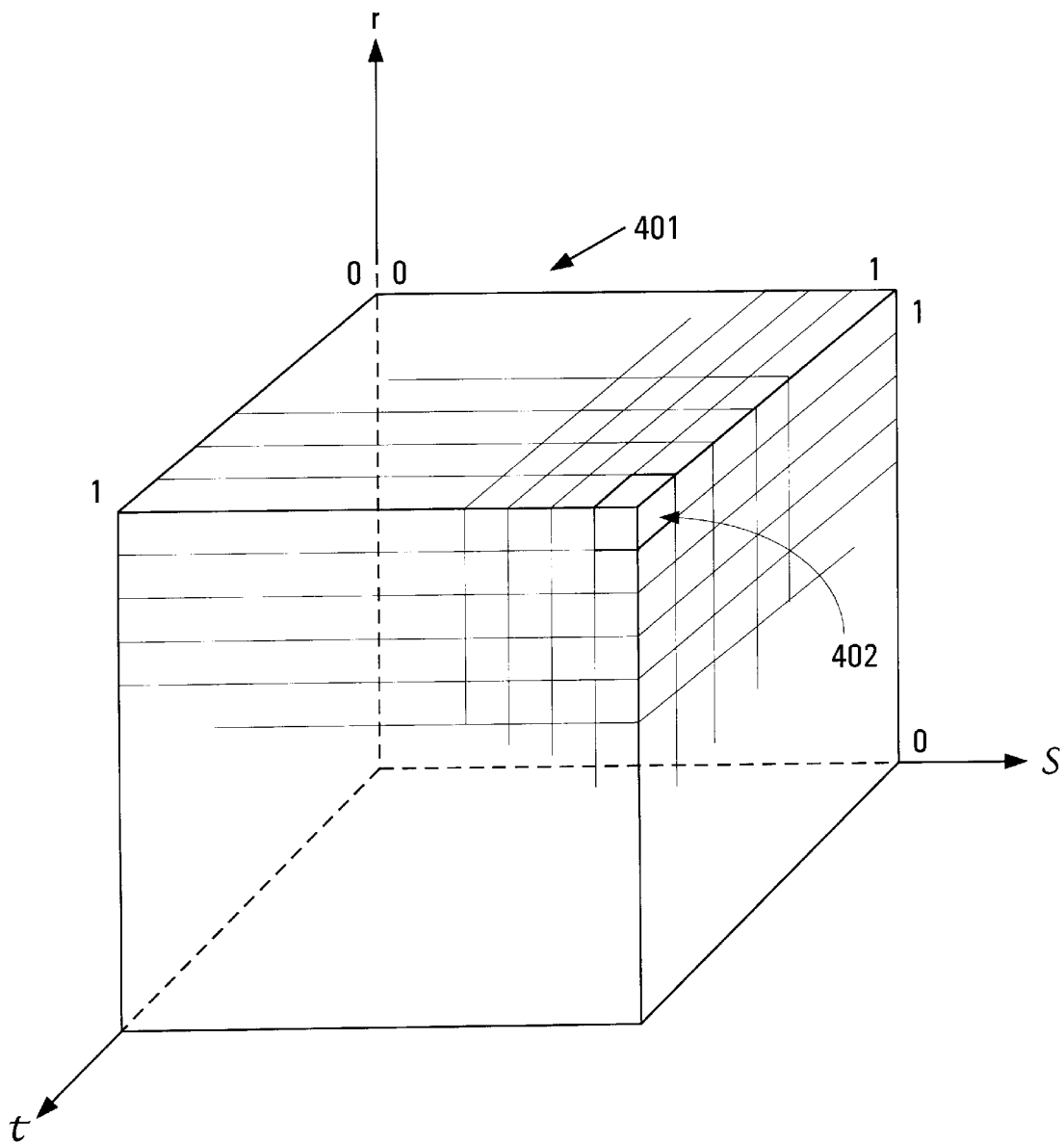
FIG. 5 represents a 3D light intensity texture map in accordance with the present invention with its separate light intensity texels that represent each point within a three dimensional graphics region.

The light presence of a predefined 3D graphics region 510 (FIG. 4A) can be represented as a volumetric entity of light as illustrated by FIG. 5. FIG. 5 includes three dimensional (3D) light intensity texture map (LTM) 401 and point light texel 402. When the present invention determines the light presence of every point within a predefined 3D graphics region 510, the light presence information for each 3D point (x, y, z) is stored within LTM 401. Point light texel 402 represents a texel coordinate position of a single point within the predefined 3D graphics region 510 (FIG. 4A) and contains the light presence value of that point. The 3D light presence texture map 401 of the present invention is stored in the computer readable memory units of computer system 112 (FIG. 1) when generated. LTM 401 is then accessed during graphics primitive rendering processes to determine the light presence at any point in the predefined 3D graphics region 510 (FIG. 4A). During this rendering process, LTM 401 can be treated as a 3D texture map in a manner disclosed in U.S. Pat. No. 5,490,240.

Figure 7:
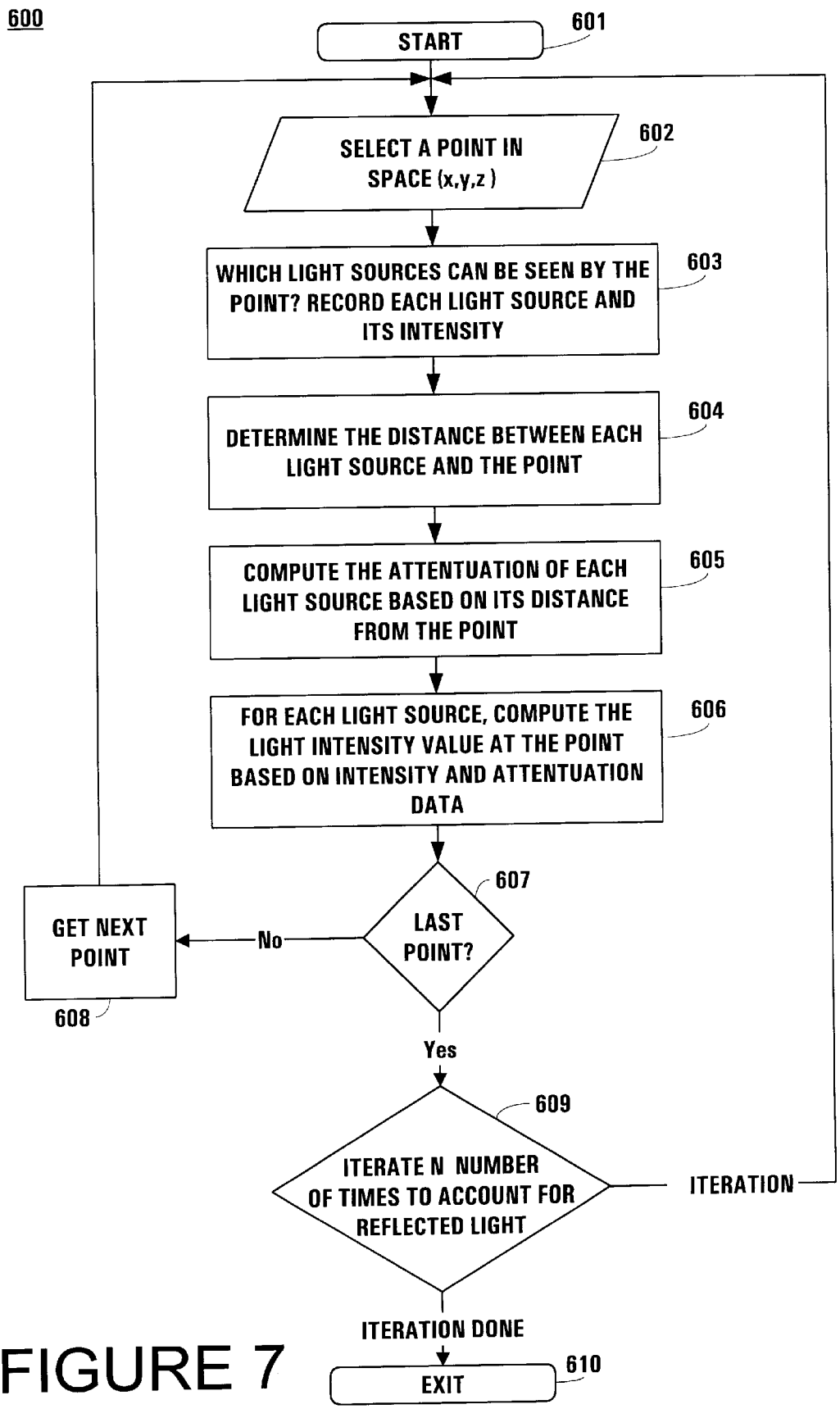
FIG. 7 shows a flowchart of an embodiment of the present invention for determining a 3D light intensity texture map of combined light sources within a predefined 3D graphics region.

Process 600 is implemented as program instructions stored in computer readable memory units of computer system 112 (FIG. 1) and is executed over processor 101. FIG. 7 shows a flowchart of an embodiment of the present invention for determining the texel values of the 3D light texture map 401 (FIG. 5) of a predefined 3D graphics region 510 (FIG. 4A) within a computer controlled graphics display system 112. FIG. 7 includes process 600 which starts at step 601. Step 602 directs the computer to select a point (e.g., 555 of FIG. 4A) within the (x, y, z) coordinate system of the predefined 3D graphics region 510. Step 603 directs the computer to determine a subset of light sources (e.g., 520 and 530 of FIG. 4A) that are within an unobstructed line of sight from the selected point. During step 603, the computer is directed to record the subset of light sources that contribute to the illumination of the point, along with its original intensity (e.g., at distance=0), in computer readable volatile memory unit 102 (e.g. random access memory unit) of FIG. 1.

After completing step 603, step 604 of FIG. 7 directs the computer to determine the distance (ds1, ds2, ds3, etc.) between the selected point and each light source (LS1, LS2, LS3, etc.) that contributes to the illumination of that point. Step 605 directs the computer to compute the attenuation factor of each light source based on its computed distance from the selected point. Attenuation factor, A, is computed based on the inverse of the square of the distance based on the below relationship:

$$A1=1/(ds1)2$$

Where A1 is the attenuation factor for light source 1 at a distance of ds1. This is computed for each light source.

Once the attenuation factor of each light source is computed, Step 606 of FIG. 7 directs the computer to determine the light intensity value at the point based on the original intensity and attenuation factor of each light source. Light intensity, LI, can be computed based on the below relationship:

$$LI1=(LSI1) \times (A1)$$

Where LSI1 is the original light source intensity of light source 1, and LI1 is the light intensity contribution at a point ds1 away from light source 1. The total light intensity contribution at the selected point is then determined by summing the light intensity contributions of each identified light source.

Upon completion of step 606, step 607 of FIG. 7 directs the computer to determine if the light intensity value of the last point of the predefined 3D graphics region 510 (FIG. 4A) has been determined. If the light intensity at the last point has not been processed by process 600, the computer is directed to proceed to step 608. Step 608 directs the computer to retrieve the next point to be selected from the predefined 3D graphics region 510. The computer repeats steps 602–608 until the light intensity value of all points (x,y, z) within 3D graphics region 510 (FIG. 4A) are determined and stored as texel values within 3D light texture map (LTM) 401 (FIG. 5).

Once the last point is determined, step 607 of FIG. 7 directs the computer to proceed to step 609. Step 609 directs the computer to perform multiple iterations to determine the reflectivity of the objects within the predefined 3D graphics region 510 (FIG. 4A) that are not original light emitters (e.g., objects 515 and 540 of FIG. 6). At a second and further iteration of process 600, each 3D point (x, y, z) of the LTM 401 (FIG. 5) that has a corresponding non zero light intensity texel value can be a light source as a light reflector. Process 600 then treats non zero texel values of LTM 401 as light sources upon each iteration to update the light intensity values stored in LTM 401 to account for reflectivity. Once these iterations are complete, the computer exits process 600 at step 610.

Figure 8:
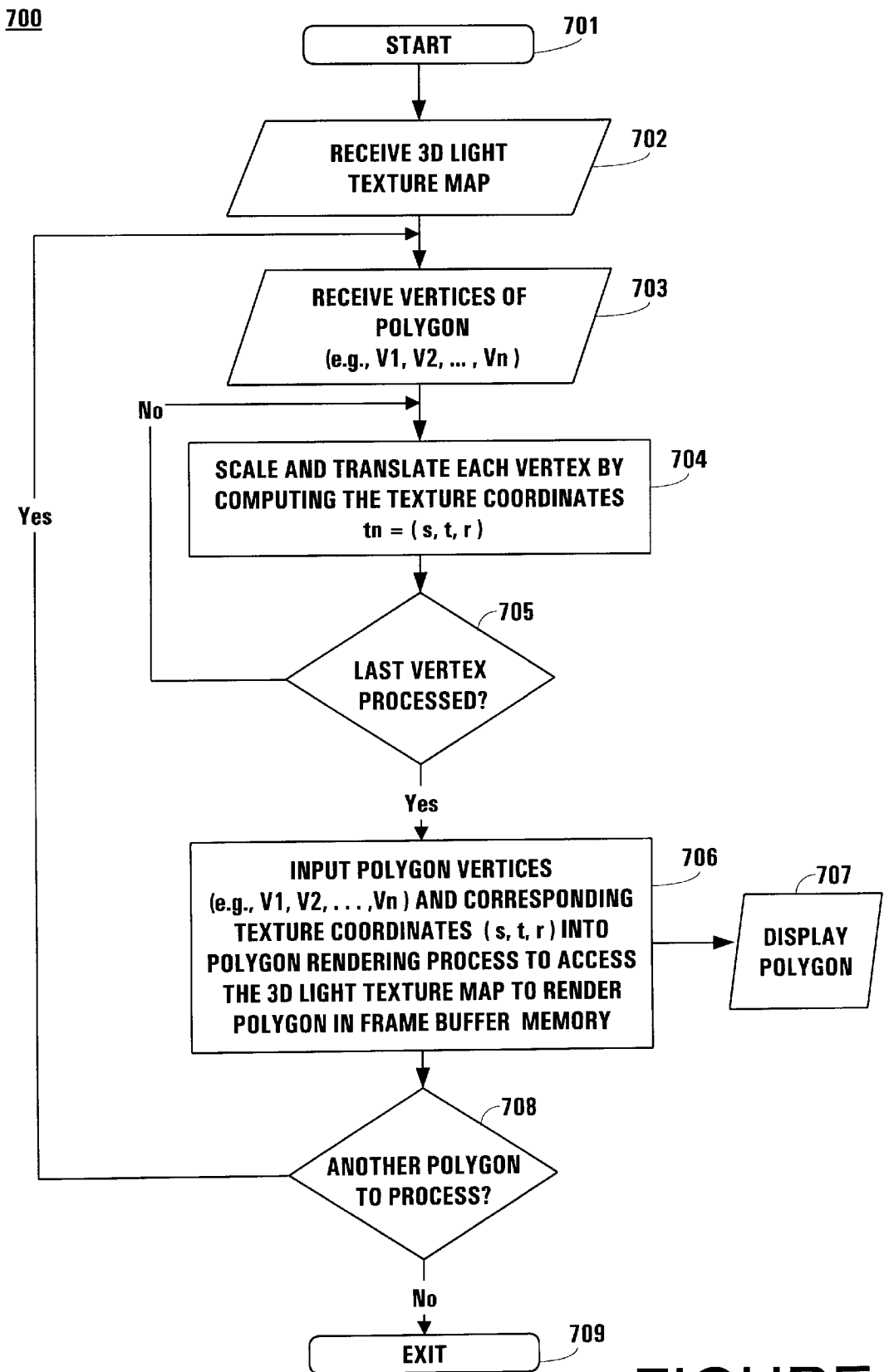
FIG. 8 shows a flowchart of an embodiment of the present invention for rendering an exemplary polygon within the displayed predefined 3D graphics region using the 3D light texture map.

Process 700 is implemented as program instructions stored in computer readable memory units of computer system 112 (FIG. 1) and is executed over processor 101. FIG. 8 shows a flowchart of an embodiment of the present invention for using 3D light texture map 401 (FIG. 5) to render graphics primitives within the predefined 3D graphics region 510 (FIG. 4A). FIG. 8 includes process 700 which starts at step 701. From step 701, the computer proceeds to step 702 which directs the computer to retrieve or access the information determined during process 600 (e.g., the 3D light texture map 401 of FIG. 5).

Figure 6:
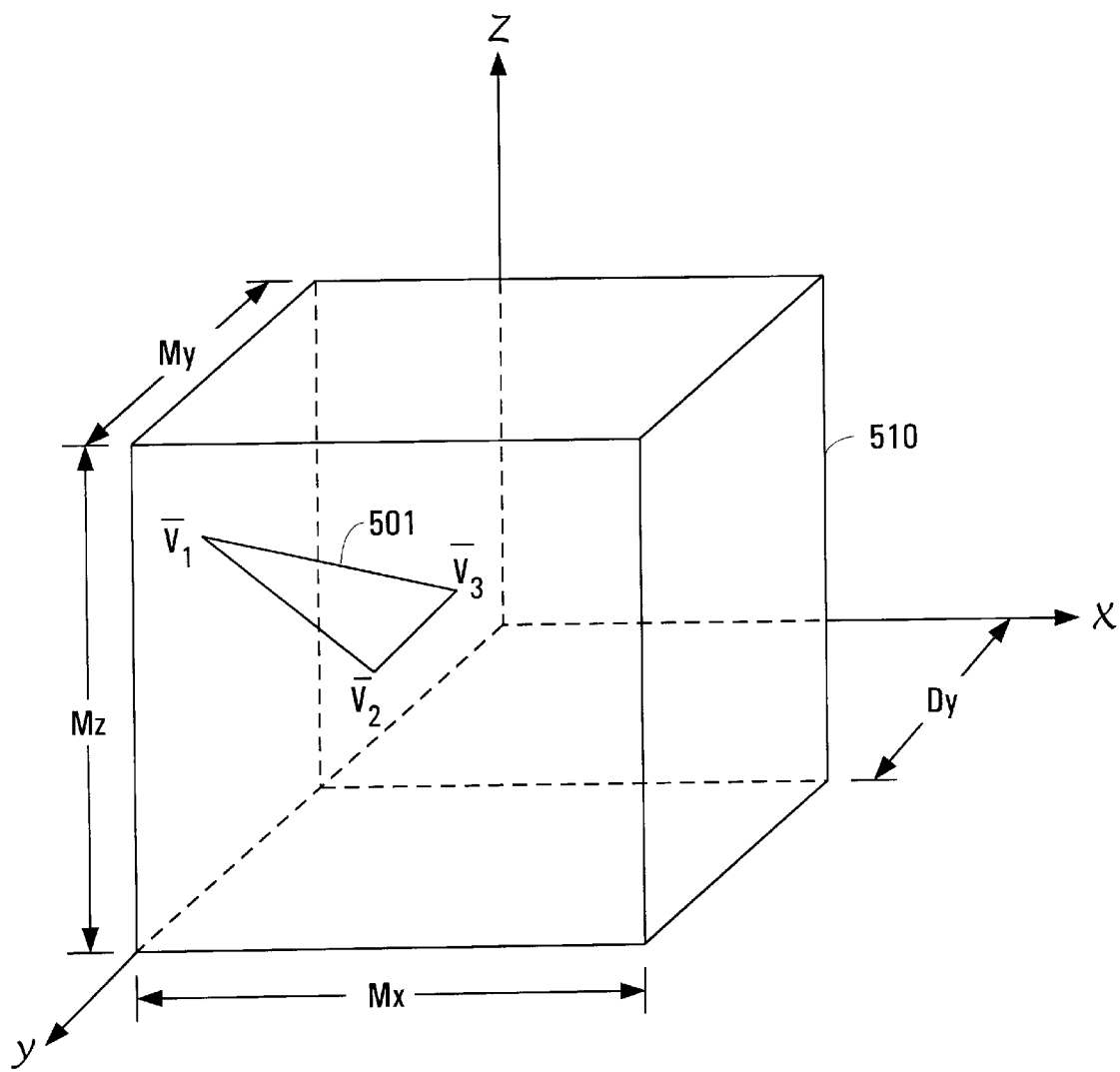
FIG. 6 shows an exemplary graphics polygon within (x, y, z) coordinates pertinent to rendering processes of the present invention.

Once the 3D light texture map (LTM) 401 is received, step 703 directs the computer to receive the (x, y, z) coordinates of vertex v1, vertex v2, and vertex v3 of an exemplary polygon 501 (FIG. 6). FIG. 6, including polygon 501 and vertices v1–v3, illustrates an example of a polygon within the (x, y, z) coordinate system that is used as a building block to create an image within a 3D graphics region 510 (FIG. 4A).

After completion of step 703, step 704 of FIG. 8 directs the computer to scale and translate each vertex (e.g., V1, V2, V3) of polygon 501 by computing its corresponding texture coordinates tn=(s, t, r) based on the below relationships:

$$s=x/Mx \quad t=(y-Dy)/My \quad r=z/Mz$$

Where x, y, and z are the coordinates for each vertex, Dy is the offset distance from the Y-axis, and Mx, My, and Mz are the dimension values of the predefined 3D graphics region 510 (FIG. 4A). Offset distance variables Dz and Dx would be required for the above relationships (r and s relationships) if the predefined 3D graphics region 510 was not located on any axis. Step 704 translates the coordinates of polygon 501 such that they are normalized with respect to the LTM 401 of FIG. 5. The LTM 401 is defined for all points within the predefined 3D graphics region 510 (FIG. 4A). Step 704 provides the texture coordinates for the predefined 3D graphics region 510 to be displayed on display device 105 (FIG. 1).

Once step 704 is complete, step 705 of FIG. 8 directs the computer to determine if the last vertex of polygon 501 (FIG. 6) has been scaled and translated by step 704. If the last vertex of the polygon 501 has not been processed, the computer repeats step 704 and 705 until all the vertices of polygon 501 are scaled and translated.

Once the last vertex of polygon 501 (FIG. 6) is processed, the computer proceeds to step 706 of FIG. 8. Step 706 directs the computer to input the vertices of polygon 501 (FIG. 6) and corresponding texture coordinates (s, t, r) into a polygon rendering process which accesses the 3D light texture map 401 (FIG. 5) to render the polygon 501 in frame buffer memory. Steps 704 and 706 operate in a manner described in U.S. Pat. No. 5,490,240, *System and Method of Generating Interactive Computer Graphic Images Incorporating Three Dimensional Textures*, by James L. Foran et al., Issued on Feb. 6, 1996. Step 707 directs the computer to display polygon 501 (FIG. 6) on display device 105 (FIG. 1).

Upon completion of step 706, step 708 of FIG. 8 directs the computer to determine whether another polygon within the predefined 3D graphics region 510 (FIG. 4A) needs to be processed by process 700. If another polygon needs to be processed, the computer repeats steps 703–708 until all the polygons that create images within the predefined 3D graphics region 510 are processed. After all the polygons are processed, the computer is directed to exit process 700 at step 709. Once the computer exits process 700, the desired predefined 3D graphics region 510 (FIG. 4A) is displayed and properly lit on display device 105 (FIG. 1) in accordance with the present invention.

Figure 9:
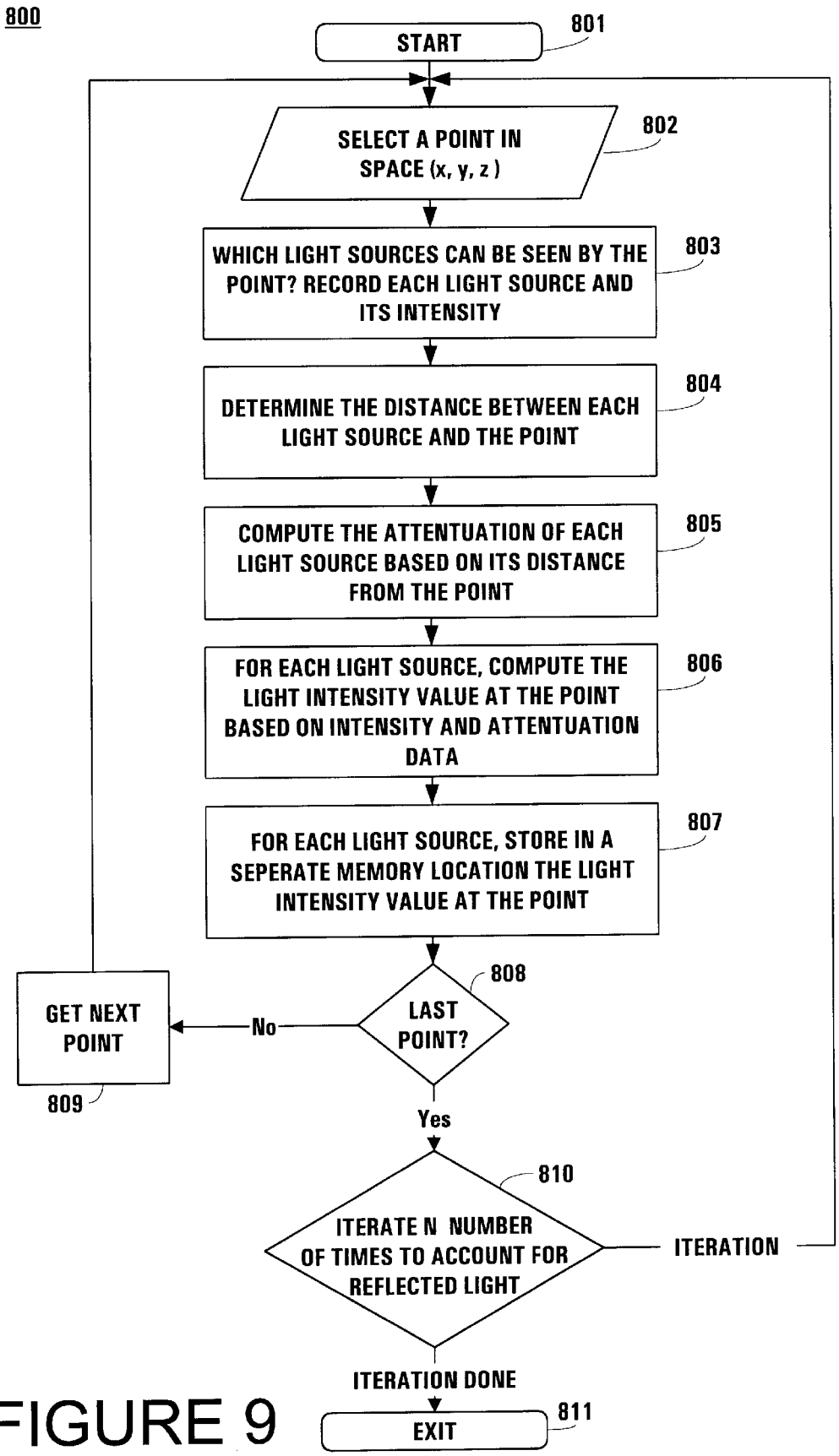
FIG. 9 shows a flowchart of an embodiment of the present invention for determining the separate 3D light texture maps of each light source contributing to the lighting within a predefined 3D graphics region.

Process 800 is implemented as program instructions stored in computer readable memory units of computer system 112 (FIG. 1) and is executed over processor 101. FIG. 9 shows a flowchart of an embodiment of the present invention for determining the texel values of separate 3D light texture maps 401 (FIG. 5) for each light source's contribution to the lighting of a predefined 3D graphics region 510 (FIG. 4A) within a computer controlled graphics display system 112. FIG. 9 includes process 800 which starts at step 801. Step 802 directs the computer to select a point (e.g., 555 of FIG. 4A) within the (x, y, z) coordinate system of the predefined 3D graphics region 510 (FIG. 4A). Step 803 directs the computer to determine a subset of light sources (e.g., 520 and 530 of FIG. 4A) that are within an unobstructed line of sight from the selected point. During step 803, the computer is directed to record the subset of light sources that contribute to the illumination of the point, along with its original intensity (e.g., at distance=0), in random access memory unit 102 (FIG. 1).

After completing step 803, step 804 of FIG. 9 directs the computer to determine the distance (ds1, ds2, ds3, etc.) between the selected point and each light source (LS1, LS2, LS3, etc.) that contributes to the illumination of that point. Step 805 directs the computer to compute the attenuation factor of each light source based on its computed distance from the selected point. Attenuation factor, A, is computed based on the inverse of the square of the distance based on the below relationship:

$$A1 = 1/(ds1)^2$$

Where A1 is the attenuation factor for light source 1 at a distance of ds1. This is computed for each light source.

Once the attenuation factor of each light source is computed, step 806 directs the computer to determine the light intensity value at the point based on the intensity and attenuation factor of each light source. Light intensity, LI, can be computed based on the below relationship:

$$LI1 = (LSI1) \times (A1)$$

Where LSI1 is the original light source intensity of light source 1, and LI1 is the light intensity contribution at a point ds1 away from light source 1. Step 807 directs the computer to store the light intensity value of the point that corresponds to each providing light source in a separate 3D light texture map 401 (FIG. 5).

After completion of step 807, step 808 of FIG. 9 directs the computer to determine if the light intensity value of the last point of the predefined 3D graphics region 510 (FIG. 4A) has been determined. If the light intensity at the last point a has not been processed by process 800, the computer is directed to proceed to step 809. Step 809 directs the computer to retrieve the next point to be selected from the predefined 3D graphics region 510. The computer repeats steps 802–809 until the light intensity value of all points within 3D graphics region 510 (FIG. 4A) are determined and stored as texel values within separate 3D light texture maps 401 (FIG. 5) for each light source.

Once the last point is determined, step 808 of FIG. 9 directs the computer to proceed to step 810. Step 810 directs the computer to perform multiple iterations to determine the reflectivity of the objects within the predefined 3D graphics region 510 (FIG. 4A) that are not original light emitters (e.g., objects 515 and 540 of FIG. 6). At a second and further iteration of process 800, each 3D point (x, y, z) of the LTM 401 (FIG. 5) that has a corresponding non zero light intensity texel value can be a light source as a light reflector. Process 800 then treats non zero texel values of each LTM 401 as light sources upon each iteration to update the light intensity values stored in each LTM 401 of the light sources that are turned on to account for reflectivity. Once these iterations are complete, the computer exits process 800 at step 811. The computer exits process 800 having determined a separate 3D light texture map 401 (FIG. 5) for each light source's contribution to the lighting of the predefined 3D graphics region 510 (FIG. 4A) within computer controlled graphics display system 112 (FIG. 1).

Figure 10:
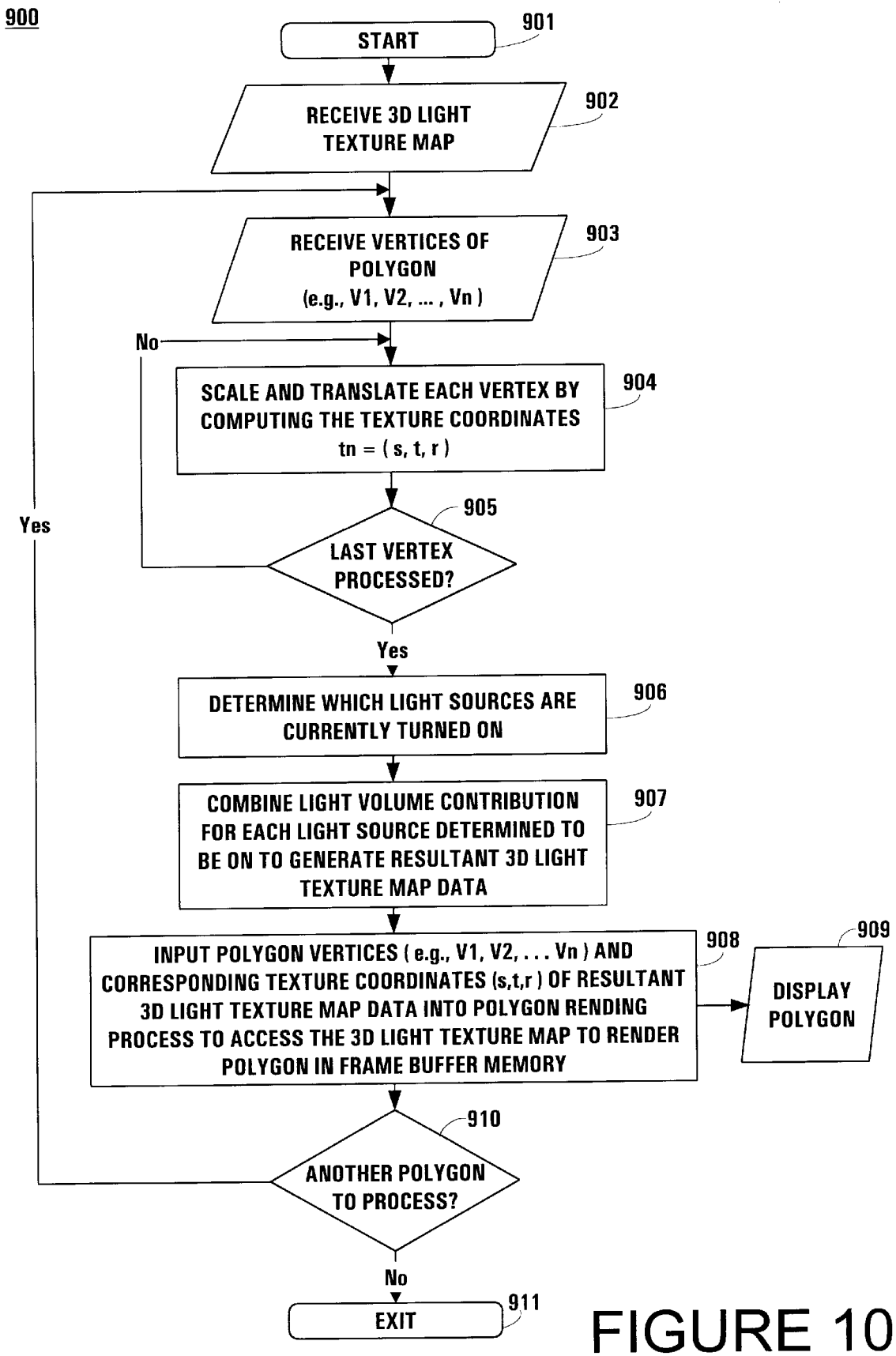
FIG. 10 shows a flowchart of an embodiment of the present invention for using any combination of the separate 3D texture maps of each light source for rendering polygons within the displayed predefined 3D graphics region to simulate light sources turned on and off.

Process 900 is implemented as program instructions stored in computer readable memory units of computer system 112 (FIG. 1) and is executed over processor 101. FIG. 10 shows a flowchart of an embodiment of the present invention for using any combination of separate 3D light texture maps 401 (FIG. 5) of each light source to render graphics primitives within the predefined 3D graphics region 510 (FIG. 4A). FIG. 10 includes process 900 which starts at step 901. From step 901, the computer proceeds to step 902 which directs the computer to retrieve or access the information determined during process 800 (e.g., all the 3D light texture maps 401 of FIG. 5).

Once the 3D light texture maps 401 of each light source are received, step 903 of FIG. 10 directs the computer to receive the (x, y, z) coordinates of vertex v1, vertex v2, and vertex v3 of an exemplary polygon 501 (FIG. 6). FIG. 6, including polygon 501 and vertices v1–v3, illustrates an example of a polygon within the (x, y, z) coordinate system that is used as a building block to create an image within a 3D graphics region 510 (FIG. 4A).

After completion of step 903, step 904 of FIG. 10 directs the computer to scale and translate each vertex (e.g., V1, V2, V3) of polygon 501 (FIG. 6) by computing its corresponding texture coordinates tn=(s, t, r) based on the below relationships:

$$s = x/Mx \quad t = (y - Dy)/My \quad r = z/Mz$$

Where x, y, and z are the coordinates for each vertex, Dy is the offset distance from the Y-axis, and Mx, My, and Mz are the dimension values of the predefined 3D graphics region 510 (FIG. 4A). Offset distance variables Dz and Dx would be required for the above relationships (r and s relationships) if the predefined 3D graphics region 510 was not located on any axis. Step 904 translates the coordinates of polygon 501 such that they are normalized with respect to the LTM 401 of FIG. 5. The LTM 401 is defined for all points within the predefined 3D graphics region 510 (FIG. 4A). Step 904 provides the texture coordinates for the predefined 3D graphics region 510 to be displayed on display device 105 (FIG. 1).

Once step 904 is complete, step 905 directs the computer to determine if the last vertex of polygon 501 (FIG. 6) has been scaled and translated by step 904. If the last vertex of polygon 501 (FIG. 6) has not been processed, the computer repeats step 904 and 905 until all the vertices of polygon 501 are scaled and translated.

Once the last vertex of polygon 501 (FIG. 6) is processed, the computer proceeds to step 906 of FIG. 10. Step 906 directs the computer to determine which light sources are currently turned on within the predefined 3D graphics region 510 (FIG. 4A). Step 907 directs the computer to combine the 3D light texture map 401 (FIG. 5) of each light source that is turned on to generate resultant 3D light texture map data.

With the resultant 3D light texture map data stored in a 3D light texture map 401 (FIG. 5), the computer proceeds to step 908 of FIG. 10. Step 908 directs the computer to input the polygon vertices of polygon 501 (FIG. 6) and corresponding texture coordinates (s, t, r) of the resultant 3D light texture map data into a polygon rendering process which accesses the 3D light texture map 401 (FIG. 5) to render polygon 501 in frame buffer memory. Steps 904 and 908 operate in a manner described in U.S. Pat. No. 5,490,240, *System and Method of Generating Interactive Computer Graphic Images Incorporating Three Dimensional Textures*, by James L. Foran et al., Issued on Feb. 6, 1996. Step 909 directs the computer to display polygon 501 (FIG. 6) on display device 105 (FIG. 1).

Upon completion of step 908, step 910 of FIG. 10 directs the computer to determine whether another polygon within the predefined 3D graphics region 510 (FIG. 4A) needs to be processed by process 900. If another polygon needs to be processed, the computer repeats steps 903–910 until all the polygons that create images within the predefined 3D graphics region 510 are processed. After all the polygons are processed, the computer is directed to exit process 900 at step 911. Once the computer exits process 900, the desired predefined 3D graphics region 510 (FIG. 4A) is displayed and properly lit on display device 105 (FIG. 1) in accordance with the present invention.

By using processes 800 and 900, a computer controlled graphics display system 112 has the ability to maintain the proper lighting within a predefined 3D graphics region 510 (FIG. 4A) when different light sources are turned on and off within region 510.

What is claimed is:

1. In a computer controlled graphics display system having a processor coupled to a bus, a display device coupled to said bus and a computer readable memory unit coupled to said bus, a method for recording light intensity within a three dimensional graphics region containing light sources, said method comprising the steps of:

a) selecting a selected point within said three dimensional graphics region;

b) determining a subset of light sources situated within said three dimensional graphics region that are also within an unobstructed line of sight from said selected point, and accessing the original light intensity for each light source within said subset;

c) determining an attenuation factor, relative to said selected point, for each light source within said subset;

d) determining a light intensity contribution of each light source of said subset at said selected point based on said original light intensity and said attenuation factor for each light source of said subset;

e) summing said light intensity contributions of each light source of said subset to arrive at a total light intensity contribution at said selected point and storing said total light intensity contribution as a texel of a three dimensional light intensity texture map situated within said computer readable memory; and f) repeating steps a) through e) for each point within said three dimensional graphics region resulting in said three dimensional light intensity texture map storing only light intensity values, wherein each light intensity value and its memory location as stored within said three dimensional light intensity texture map have a one-to-one correspondence with a particular (x, y, z) coordinate position of said three dimensional graphics region.

2. A method as described in claim 1 wherein said storing step of step e) comprises the step of storing said total light intensity contribution into said three dimensional light intensity texture map in a texel coordinate position that is determined based on the three dimensional location of said selected point.

3. A method as described in claim 1 wherein said step c) comprises the steps of:

determining a distance between said selected point and each of said light sources of said subset; and determining said attenuation factor for each light source of said subset based on the inverse of the square of the corresponding distance from said selected point and each light source.

4. A method as described in claim 1 further comprising the step of determining reflectivity by repeating said steps a) through f) wherein each point within said three dimensional graphics region having a corresponding non zero light intensity texel value of said three dimensional light intensity texture map is treated as a light source by steps b) through e).

5. A method as described in claim 1 wherein said step d) comprises the step of multiplying said original light intensity and said attenuation factor for each respective light source of said subset to determine the corresponding light intensity contribution for each respective light source.

6. A method as described in claim 1 further comprising the step of rendering a polygon on said display screen using texels of said three dimensional light intensity texture map to determine light intensity values corresponding to pixels within said polygon, said polygon situated within said three dimensional graphics region.

7. A computer controlled graphics display system comprising:

a processor coupled to a bus;

a display device coupled to said bus; and a computer readable memory unit coupled to said bus and containing program instructions stored therein that when executed over said processor implement a method of recording light intensity within a three dimensional graphics region containing light sources, said method comprising the steps of:

a) selecting a selected point within said three dimensional graphics region;

b) determining a subset of light sources situated within said three dimensional graphics region that are also within an unobstructed line of sight from said selected point, and accessing the original light intensity for each light source within said subset;

c) determining an attenuation factor for each light source within said subset relative to said select point;

d) determining a light intensity contribution of each light source of said subset at said selected point based on said original light intensity and said attenuation factor for each light source of said subset;

e) summing said light intensity contributions of each light source of said subset to arrive at a total light intensity contribution at said selected point and storing said total light intensity contribution as a texel of a three dimensional light intensity texture map situated within said computer readable memory; and f) repeating steps a) through e) for each point within said three dimensional graphics region resulting in said three dimensional light intensity texture map storing only light intensity values, wherein each light intensity value and its memory location stored within said three dimensional light intensity texture map have a one-to-one correspondence with a particular (x, y, z) coordinate position of said three dimensional graphics region.

8. A computer system as described in claim 7 wherein said storing step of step e) of said method comprises the step of storing said total light intensity contribution into said three dimensional light intensity texture map in a texel coordinate position that is determined based on the three dimensional location of said selected point.

9. A computer system as described in claim 7 wherein said step c) of said method comprises the steps of:

determining a distance between said selected point and each of said light sources of said subset; and determining said attenuation factor for each light source of said subset based on the inverse of the square of the corresponding distance from said selected point and each light source.

10. A computer system as described in claim 7 wherein said method further comprises the step of determining reflectivity by repeating said steps a) through f) wherein each point within said three dimensional graphics region having a corresponding non zero light intensity texel value of said three dimensional light intensity texture map is treated as a light source by steps b) through e).

11. A computer system as described in claim 7 wherein said step d) of said method comprises the step of multiplying said original light intensity and said attenuation factor for each respective light source of said subset to determine the corresponding light intensity contribution for each respective light source.

12. A computer system as described in claim 7 wherein said method further comprises the step of rendering a polygon on said display screen using texels of said three dimensional light intensity texture map to determine light intensity values corresponding to pixels within said polygon, said polygon situated within said three dimensional graphics region.

13. In a computer controlled graphics display system having a processor coupled to a bus, a display device coupled to said bus and a computer readable memory unit coupled to said bus, a method for recording light intensity within a three dimensional graphics region containing light sources, said method comprising the steps of:

a) selecting a selected point within said three dimensional graphics region;

b) determining a subset of light sources situated within said three dimensional graphics region that are also within an unobstructed line of sight from said selected point, and accessing the original light intensity for each light source within said subset;

c) determining an attenuation factor for each light source within said subset relative to said select point;

d) determining a light intensity contribution of each light source of said subset at said selected point based on said original light intensity and said attenuation factor for each light source of said subset;

e) storing each respective light intensity contribution into a texel position of a separate three dimensional light intensity texture map that corresponds to a respective light source, each separate three dimensional light intensity texture map situated within said computer readable memory unit; and f) repeating steps a) through e) for each point within said three dimensional graphics region such that a separate three dimensional light intensity texture map is generated for each respective light source, wherein each three dimensional light intensity texture map stores only light intensity values, wherein each light intensity value and its memory location as stored within each three dimensional light intensity texture map have a one-to-one correspondence with a particular (x, y, z) coordinate position of said three dimensional graphics region.

14. A method as described in claim 13 wherein said storing step of step e) comprises the step of storing said light intensity contribution of each light source of said subset into a texel position of said separate three dimensional light intensity texture map in a texel coordinate position that is determined based on the three dimensional location of said selected point.

15. A method as described in claim 13 wherein said step c) comprises the steps of:

determining a distance between said selected point and each of said light sources of said subset; and determining said attenuation factor for each light source of said subset based on the inverse of the square of the corresponding distance from said selected point and each light source.

16. A method as described in claim 13 further comprising the step of determining reflectivity by repeating said steps a) through f) wherein each point within said three dimensional graphics region having a corresponding non zero light intensity texel value of said three dimensional light intensity texture map is treated as a light source by steps b) through e).

17. A method as described in claim 13 wherein said step d) comprises the step of multiplying said original light intensity and said attenuation factor for each respective light source of said subset to determine the corresponding light intensity contribution for each respective light source.

18. A method as described in claim 13 further comprising the steps of:

determining which light sources of said three dimensional graphics region are on;

generating a resultant three dimensional light intensity texture map by summing together each three dimensional light intensity texture map corresponding to a light source that is on; and rendering a polygon on said display screen using texels of said resultant three dimensional light intensity texture map to determine light intensity values corresponding to pixels within said polygon, said polygon situated within said three dimensional graphics region.

19. A computer controlled graphics display system comprising:

a bus;

a processor coupled to said bus, a display device coupled to said bus; and a computer readable memory unit coupled to said bus, said computer readable memory unit having stored therein a light intensity data structure addressed by a three dimensional coordinate index and comprising:

a plurality of light intensity values stored in a three dimensional matrix and corresponding to a plurality of three dimensional points within a three dimensional graphics region wherein each light intensity value is stored in a respective memory location within said three dimensional matrix such that said respective location has a one-to-one correspondence with the particular three dimensional point to which it is associated and wherein each light intensity value corresponds to the aggregate light contributions of light sources within said graphics region as seen at said three dimensional point to which it is associated and wherein said light intensity data structure stores only light intensity values and is used by said processor for rendering graphics images on said display device.

20. A system as described in claim 19 wherein said memory further comprises instructions for implementing a step of rendering a polygon on said display screen using light intensity values of said light intensity data structure to determine light intensity values corresponding to pixels within said polygon, said polygon situated within said three dimensional graphics region.

* * * * *